(12) United States Patent
Ryann

(10) Patent No.: US 7,536,150 B2
(45) Date of Patent: May 19, 2009

(54) WIRELESS EARRING ASSEMBLY

(76) Inventor: William Frederick Ryann, 8039 Dove Flight, San Antonio, TX (US) 78250

( * ) Notice: Subject to any disclaimer, the term of this patent is extended or adjusted under 35 U.S.C. 154(b) by 434 days.

(21) Appl. No.: 11/218,860

(22) Filed: Sep. 2, 2005

(65) Prior Publication Data
US 2007/0054703 A1    Mar. 8, 2007

Related U.S. Application Data (63) Continuation-in-part of application No. 11/218,391, filed on Aug. 29, 2005, and a continuation-in-part of application No. 11/218,392, filed on Aug. 29, 2005, now Pat. No. 7,505,793.

(51) Int. Cl.
*H04H 40/00* (2008.01)

(52) U.S. Cl. ............ 455/3.06; 455/575.1; 455/575.2; 455/575.6; 455/90.3; 379/330; 379/428.01; 379/431

(58) Field of Classification Search ............ 455/3.06, 455/575.1, 575.2, 575.6, 90.3; 379/330, 379/428.01, 431, 447
See application file for complete search history.

(56) References Cited

U.S. PATENT DOCUMENTS

| | | | |
|---|---|---|---|
| D372,312 S | 7/1996 | Lange | |
| 5,721,783 A * | 2/1998 | Anderson | 381/328 |
| 6,091,546 A | 7/2000 | Spitzer | |
| 6,091,832 A | 7/2000 | Shurman | |
| 6,760,459 B2 | 7/2004 | Bae | |
| 6,764,133 B2 * | 7/2004 | Osato | 297/217.4 |
| 6,823,171 B1 | 11/2004 | Kaario | |
| 6,868,284 B2 | 3/2005 | Bae | |
| 7,013,018 B2 * | 3/2006 | Bogeskov-Jensen | 381/381 |
| 2004/0066948 A1 * | 4/2004 | Bogeskov-Jensen | 381/376 |
| 2004/0198391 A1 | 10/2004 | Sanders | |
| 2004/0239874 A1 | 12/2004 | Swab | |
| 2005/0046789 A1 | 3/2005 | Jannard | |
| 2005/0046790 A1 | 3/2005 | Jannard | |
| 2005/0107131 A1 * | 5/2005 | Abramov | 455/569.1 |
| 2006/0166705 A1 * | 7/2006 | Seshadri et al. | 455/569.1 |
| 2007/0049351 A1 * | 3/2007 | Ryann | 455/569.1 |
| 2007/0058831 A1 | 3/2007 | Rie | |
| 2007/0159371 A1 * | 7/2007 | Song et al. | 341/155 |

FOREIGN PATENT DOCUMENTS

| | | |
|---|---|---|
| WO | WO/2005/053352 | 6/2005 |
| WO | WO 2005053352 A1 * | 6/2005 |

OTHER PUBLICATIONS

Enclosed Copy, Aug. 29, 2005, Ryann (Wireless Earpiece).
Enclosed Copy, Aug. 29, 2005, Ryann (Wireless Earpiece Assembly).

* cited by examiner

*Primary Examiner*—Matthew D Anderson
*Assistant Examiner*—Minh D Dao (57) ABSTRACT

A wireless earpiece assembly configured to physically contact a user substantially exclusively at an outer ear location of a user's ear when in use. For example, the outer ear location may be an ear lobe providing the assembly with an appearance of an earring. The assembly is configured to distribute a significant portion of its bulk away from the isolated location of a user's ear for long term user comfort without sacrifice of audio or communicational integrity. The wireless earpiece assembly simultaneously eliminates extraneous wiring in order to optimize the un-encumbering user-friendly advantages afforded by wireless technology.

27 Claims, 6 Drawing Sheets

WIRELESS EARRING ASSEMBLY

PRIORITY CLAIM

This Patent Document is a Continuation-In-Part of Ser. No. 11/218,391, Wireless Earpiece (William F. Ryann), filed Aug. 29, 2005 and Ser. No. 11/218,392, Wireless Earpiece Assembly (William F. Ryann), filed Aug. 29, 2005 now U.S. Pat. No. 7,505,793.

BACKGROUND

Embodiments described relate to earpieces for coupling or pairing to an audio device. In particular, embodiments relate to wireless earpiece assemblies for securing at the outer ear of a user.

BACKGROUND OF THE RELATED ART

Mobile audio devices are experiencing a dramatic growth in utilization. Such devices have evolved from transistor radios, televisions and mobile cassette players to more modern communication devices such as the mobile cell phones of today. Recently, it has become commonplace for mobile audio devices to incorporate non-audio functionality, such as cell phones incorporating picture taking, calendaring, e-mailing, internet web browsing, and other features. Similarly, different types of mobile audio devices are beginning to merge, such as cell phones that include the capacity to play digital music.

As mobile audio devices continue to play an ever increasing role in people's lives, the importance of ergonomic utilization of such devices has also increased. For example, an audio output mechanism such as an earpiece or headphones is often wired to a handheld mobile audio device such as a cell phone. In this manner, the cell phone need not be held right at the user's ear during operation. The wired earpiece allows the cell phone to be kept away from the user's ear without requiring use of less discrete means such as a speakerphone function. Use of a wired earpiece with the cell phone in this manner provides a degree of hands-free user-friendliness. Keeping the user's hands more free can improve safety when the user is simultaneously engaged in other tasks. For example, in many jurisdictions, hands-free use of cell phones has become required by law during operation of a motor vehicle as a matter of public safety.

In order to further address ergonomic, hands-free, and other user-friendly objectives when utilizing a mobile audio device, an earpiece may be employed in a wireless manner. For example, wireless earpieces have been conceived and developed which do not require physical wiring directly to the mobile audio device. That is, a wireless earpiece may be secured at a user's ear with a cell phone wirelessly coupled or "paired" thereto. In this manner, cumbersome wiring from the earpiece all the way to the cell phone is eliminated. The cell phone may even be somewhat remote from the user during use. For example, the driver of an automobile may be using a cell phone via a wireless earpiece while the potentially distracting cell phone easily remains away from the driver's hands or immediate vicinity.

Unfortunately, a high quality wireless earpiece must be of dramatically increased size as compared to a traditional wired mechanism. This is because, in order to provide high quality wireless capability, the wireless earpiece is equipped with a power source, microphone, transceiver, antenna, microprocessor, and potentially other components, all of which are not required in a traditional wired earpiece. In a traditional wired earpiece there is present a physically wired connection to the cell phone where such components can be maintained, distributed, or rendered unnecessary altogether. However, the nature of a wireless earpiece necessitates the inclusion of wireless and other components right at the earpiece. Thus, the earpiece often includes a large bulky casing for housing all of these components in addition to providing a speaker and other traditional wired earpiece components.

As an alternative to a bulky casing, inductive loop and other similar devices may be available, but are generally much less desirable. Inductive loop devices involve the inherent cumbersome nature of forming an inductive loop about the user and result in generally low audio integrity and overall quality.

The large wireless earpiece described above is configured with a casing large enough to house the above noted components and is configured to rest over, behind, or around the back of the user's ear. It is the user's ear that is forced to bear the bulk of the entire earpiece. In total, this may include a casing having a bulk of 3 to 5 inches across and up to ¾ of an inch wide or more, all resting right at the user's ear, sandwiched between the user's ear and head, blocking the auditory canal of the user's ear, or taking some other bulky and cumbersome configuration.

Employing a wireless earpiece contributing extensive bulk at the user's ear sacrifices long term user comfort for the short term user-friendliness provided by the wireless nature of the earpiece. Extensive wear of such wireless earpieces can be quite uncomfortable, require frequent placement, replacement, and repositioning, and render the user-friendliness of 'wireless capacity' to be of diminishing value to the user. Furthermore, attempts to redistribute the bulk resulting from such wireless earpiece components away from the user's ear to other nearby accessories to accommodate them, such as eyewear or headwear, similarly sacrifices user-friendliness. For example, the user may not require or desire wearing prescription glasses, sunglasses, hats, headphones, or other cumbersome and otherwise generally unnecessary accessories.

SUMMARY

A wireless earpiece assembly is provided having a speaker, a casing, and a fastener accommodated by a coupling mechanism. The fastener secures the wireless earpiece assembly to an isolated outer ear location of a user's ear.

DETAILED DESCRIPTION

Embodiments are described with reference to certain earpiece assemblies having wireless features. These may include single ear earpiece assemblies or those delivering sound to both of a user's ears in stereo akin to traditional headphones. For example, with reference to FIGS. 1-4, multiple wireless earpiece assemblies 100 may be employed simultaneously, perhaps for reception of stereo quality sound. Regardless, embodiments described herein may be particularly useful when a wireless earpiece assembly is to be worn for any extended period of time.

Figure 1:
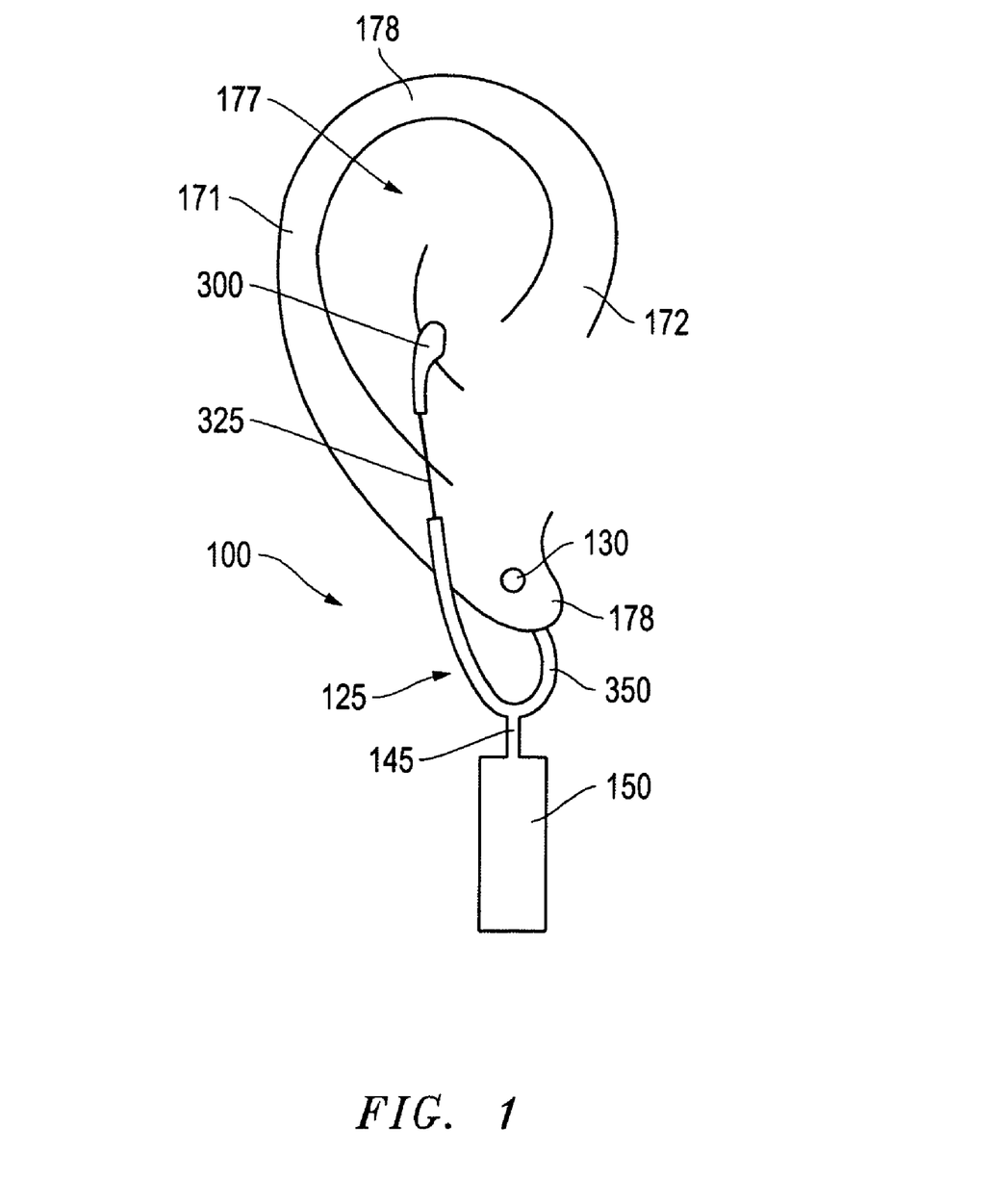
FIG. 1 is a side perspective view of an embodiment of a wireless earpiece assembly secured to an outer ear location of a user's ear.

Referring to FIG. 1, an embodiment of a wireless earpiece assembly 100 is shown having an appearance of an earring. The wireless earpiece assembly 100 is an earpiece assembly incorporating some wireless capacity. In the embodiment of FIG. 1, wireless transmission may come from a component within a casing 150, as described further herein. The wireless earpiece assembly 100 also includes a single coupling mechanism 125 to accommodate a speaker support 325 with a speaker 300 for delivery of sound to an ear 177 of a user 175.

Figure 2:
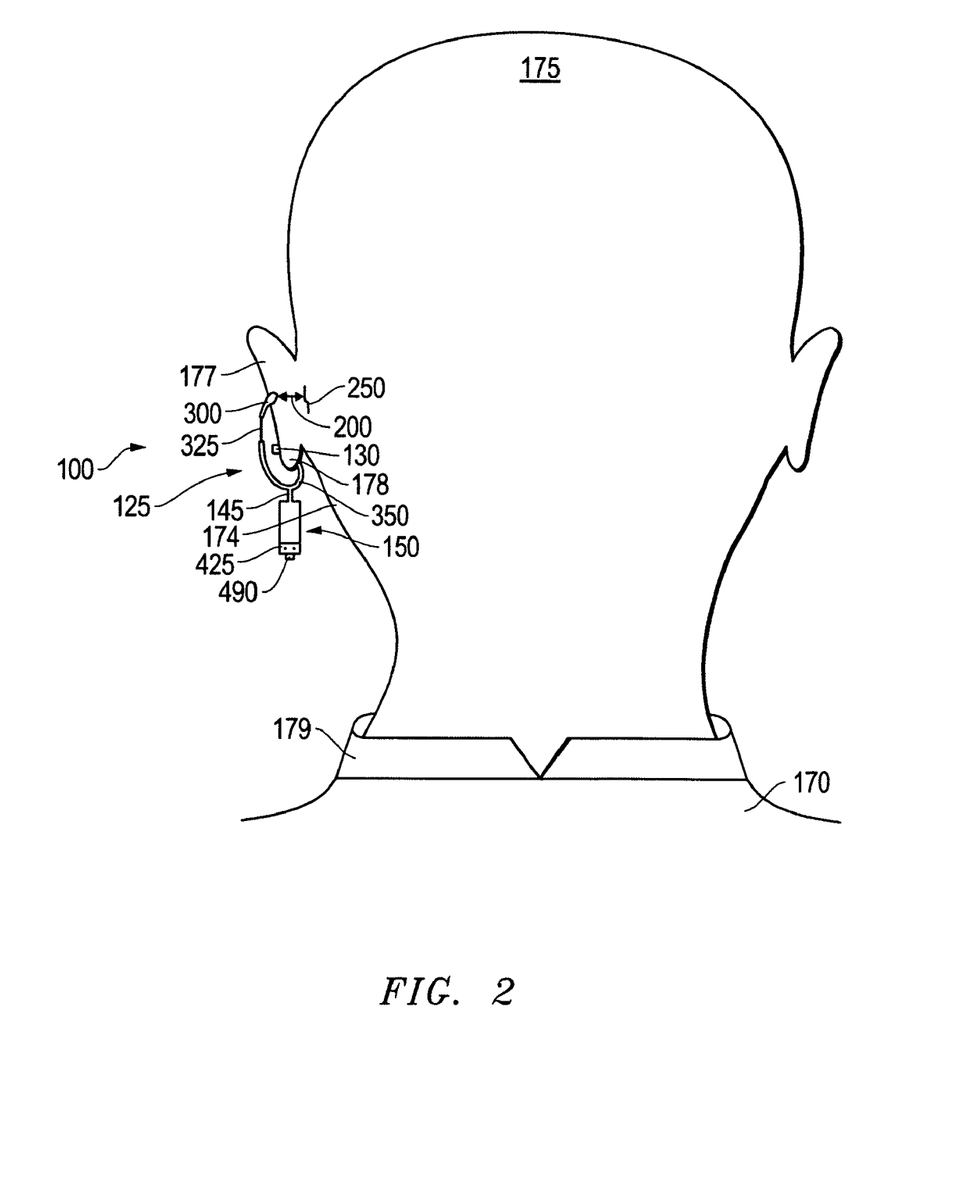
FIG. 2 is a front view of the wireless earpiece assembly of FIG. 1 worn by a user.

Referring to FIGS. 1 and 2, and as described further hereinbelow, the wireless earpiece assembly 100 takes the appearance of an earring or other ear jewelry in that it is secured to a somewhat isolated location at the outer ear 178 of a user 175. In the embodiment shown, the isolated location of the outer ear 178 is an ear lobe which has been pierced with a fastener 130 therethrough. Thus, as noted, the wireless earpiece assembly 100 does take on the appearance of a conventional earring.

The wireless earpiece assembly 100 may be secured to other isolated locations of the outer ear 178 from the ear lobe all the way around the ear 177 circumferentially to cartilage at the back 171 or front 172 of the ear 177. Furthermore, the fastener 130 may involve an ear piercing as shown or alternatively an ear clamp for securing the wireless earpiece assembly 100 to an ear 177 which is not pierced. Additionally, the fastener 130 may be an ear cuff or ear wrap for securing the assembly 100 from a location at the back 171 or front 172 of the ear 177 by wrapping substantially about cartilage of the outer ear 178 thereat. An ear cuff or an ear wrap may be configured for added security by piercing or clamping tightly about the outer ear 178.

Regardless of the particular configuration, the wireless earpiece assembly 100 fastens to a single isolated location at an outer ear 178. The assembly 100 is exclusively and entirely supported from this location at the outer ear 178. In fact, an isolated outer ear 178 location is substantially the only portion of the user 175 physically affected by any portion of the wireless earpiece assembly 100. That is, physical contact, for the purpose of securing the assembly 100, is limited to the fastener 130 of the wireless earpiece assembly 100. As shown in FIGS. 1 and 2, the fastener 130 is a conventional post and backing for a pierced ear 177. As noted above, alternate embodiments of the fastener 130 may include clamps or cuffs or wraps. In the case of clamps, cuffs, or wraps, the fastener 130 may contact no more than about 1.0 inches, longitudinally at the surface of the outer ear 178, preferably, less than about 0.5 inches. In the case of a fastener 130 for a pierced ear, even a very large backing may take up no more than about 0.25 inches in diameter across the surface of the outer ear 178 at the ear lobe. The fastener 130 may be larger than indicated here. However, embodiments of even larger fasteners 130 may include no more than about 1.0 inches, measured longitudinally, for actually interfacing the surface of the outer ear 178 for the purpose of securing the wireless earpiece assembly 100. For example, larger fasteners 130 may include additional portions or extensions for ornamental, stabilizing, or balancing purposes as described further herein.

The minimal amount of interface between the wireless earpiece assembly 100 and the user 175 results in no bulky crammed components or features of the assembly 100 sandwiched behind the ear 177 or left covering it. Rather, as described further herein, the significant bulk of the wireless earpiece assembly 100, in the form of a casing 150, is suspended from the user's ear 177 to a position away from the area behind or covering the ear 177. Positioning the bulk of the wireless earpiece assembly 100 in this manner drastically enhances user comfort for long term wear of the assembly 100.

Continuing with reference to FIGS. 1 and 2, a coupling mechanism 125 is shown which accommodates and terminates at the fastener 130 noted above. The coupling mechanism 125 also accommodates a speaker 300 and the casing 150. In the embodiment shown, the coupling mechanism 125 includes a main body 350 with a speaker support 325 extending therefrom for accommodating the speaker 300. The main body 350 also has a casing support 145 extending therefrom for accommodating the casing 150. However, in an alternate embodiment, the casing 150, and any wireless components 400 thereof, may be integral with the main body 350 of the coupling mechanism 125 as opposed to separated therefrom via a casing support 145 as shown (see FIG. 4).

As shown in FIGS. 1 and 2, the coupling mechanism 125 acts to displace the bulk of the wireless earpiece assembly 100 by taking on a conformation similar to an earring. For example, the main body 350 of the coupling mechanism 125 resembles a loop earring affixed to an isolated location of the ear 177. This provides a uniquely positioned base from which features of the wireless earpiece assembly 100 may be accommodated as noted above. The coupling mechanism 125 itself makes minimal contact with the user 175 at the outer ear 178 by employing a main body 350 as shown and described. The main body 350 is even sized and shaped to substantially avoid contact with a lower temporal region 174 adjacent a portion of the user's outer ear 178.

In one embodiment, the casing support 145 extending from the main body 350 of the coupling mechanism 125 is a low profile extension, generally less than about 0.25 inches in width, and configured to suspend and further displace the bulk of the casing 150. The casing support 145 also supports communication between the speaker 300 and components 400 within the casing 150 as described further herein (see FIG. 4).

As also indicated above, the coupling mechanism 125 and casing support 145 shown, displace the bulk of the casing 150 away from the user's ear 177 to a location immediately below the ear 177. However, the casing may be displaced to any location between the ear 177 and a location above a neckline of the user 175. With reference to FIG. 2, the neckline would be located at or below a collar 179 of an upper garment 178 of the user 175. In one embodiment, the length of the casing support 145 may be up to about 2.5 inches.

The casing support 145 described above is coupled to the casing 150 through the coupling mechanism 125 by conventional means. In order to provide electrical conductivity, the casing support 145 may include an electrically conductive core. For example, in one embodiment, the casing support 145 may be dual conductor wiring akin to conventional speaker wiring. The casing 150 may suspend loosely from the coupling mechanism 125 by way of a pliant or loosely conforming casing support 145 furthering lending an appearance of a dangling earring to the wireless earpiece assembly 100. In this embodiment, the microphone 429 may be a focused microphone, such as an array microphone, incorporated into the casing 150 to enhance audio reception thereat (see FIG. 4).

In another embodiment, the casing support 145 may be rigid and immobile or configured to stably conform to a position determined by the user 175. In this manner, the wireless earpiece assembly 100 may display increased stability as compared to an embodiment where the casing 150 dangles loosely from the coupling mechanism 125.

Figure 6:
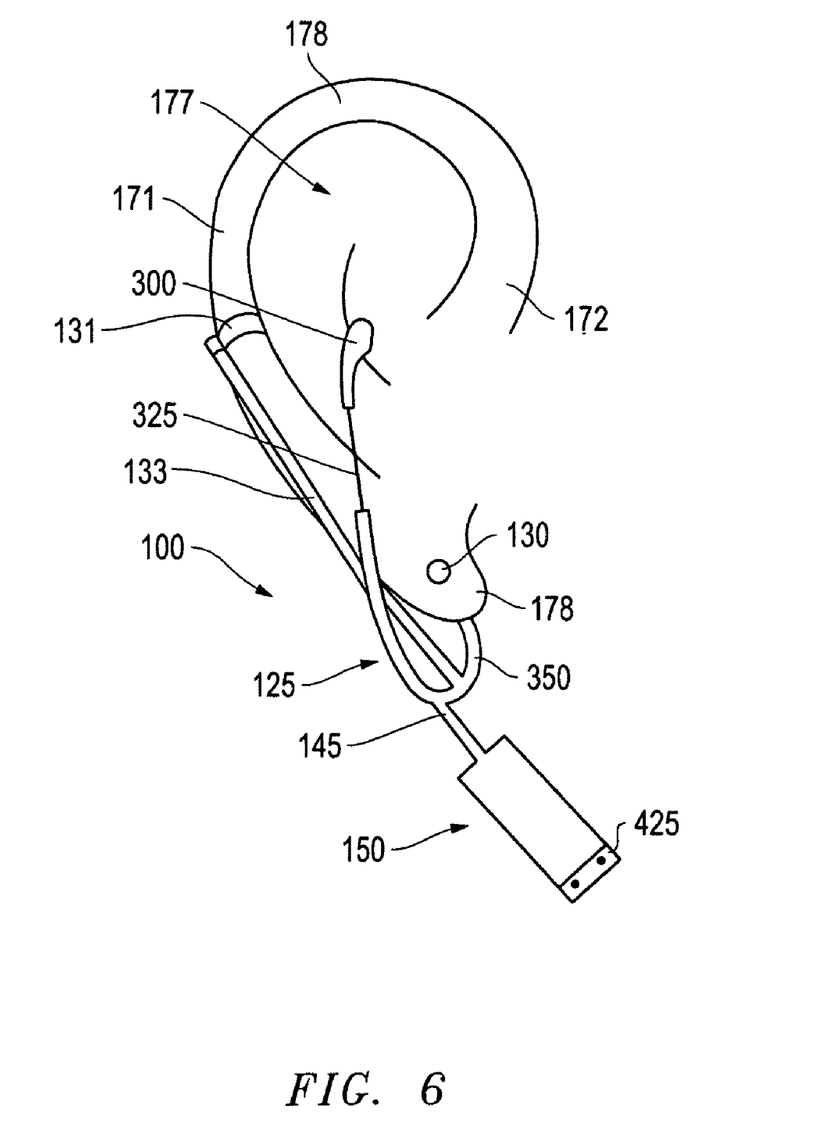
FIG. 6 is a side perspective view of an alternate embodiment of a wireless earpiece assembly secured to multiple outer ear locations of a user's ear.

With added reference to FIG. 6, additional features may be provided for sake of stability. Namely, in order to further enhance stability and balance, the coupling mechanism 125 may also include multiple fasteners 130, 131, contact a larger surface area of the outer ear 178, as in the case of an ear cuff or ear wrap noted above, or even employ a combination thereof. For example, in one embodiment, a fastener 130 is provided at the terminal end of the coupling mechanism 125 as shown in FIGS. 1 and 2. Furthermore, an extension 133 terminating in an ear cuff 131 is provided from the coupling mechanism 125 for securing to the back 171 of the outer ear 177 in order to provide added stability and security to the wireless earpiece mechanism 100. In such an embodiment, the casing support 145 and casing 150 may even be positioned in more of a lateral direction to direct a microphone portion 425 thereof nearer a mouth of the user 175. Further features may also be employed for enhancing security and balance of the wireless earpiece assembly 100. These may include incorporation of the casing components 400 into the coupling mechanism 125 itself as indicated above or, for balance in particular, providing an additional weighted extension from the coupling mechanism 125. Similarly, the casing 150 may be precisely positioned along the coupling mechanism 125 relative to, and in light of, the speaker 300 and its associated weight (i.e. as a counterbalance thereto).

In order to achieve both conductivity and stable conformation as described in certain embodiments above, the casing support 145 may include between about 8 and about 20 gauge dual conductor metal wiring, most preferably of copper. However, the particular gauge, overall dimensions, and materials selected for the casing support 145 will be based in part on the weight of the supported casing 150. For example, in one embodiment, the casing support 145 may include 10-16 gauge dual copper wiring, with each line independently insulated with up to about 15 mils of a polyethylene, nylon, or other conventional insulating jacket. Such a casing support 145 would reliably and stably support a casing 150 in excess of about 0.75 ounces as shown in FIG. 1. Additionally, in this embodiment, the casing support 145 would be no wider across, in diameter or otherwise, than about 0.2 inches, well sized for coupling to closely sized conventional wiring or other conductive means through the coupling mechanism 125. Alternatively, the casing support 145 may include conventional higher gauge wiring through a non-compliant cylindrical passage.

As described with reference to FIGS. 1-4, a substantial portion of the bulk of the wireless earpiece assembly 100 is found at the casing 150 where several components 400 of the wireless earpiece assembly 100 are housed. As components 400 continue to become lighter and potentially smaller over time, discomfort to the user 175 as a result solely of the weight of the casing 150 continues to diminish. However, by displacing the casing 150 itself as shown, discomfort due to the bulk of the casing 150 is immediately and substantially eliminated altogether.

Continuing with reference to FIGS. 1 and 2, addressing user comfort by displacement of the bulk of the casing 150, is achieved in a manner employing negligible, if any, actual wiring, in the conventional sense. That is, the wireless earpiece assembly 100 includes no wiring beyond what may be present between the speaker 300 and the casing 150. The configuration of the wireless earpiece assembly is unitary with no cumbersome wiring to interfere with the user's natural hand or body movements. There is no wiring even present within the user's own line of sight.

As shown in FIGS. 1 and 2, the wireless earpiece assembly 100 takes on the appearance of an earring with a backing actually at the outer side of the ear lobe of the user 175. However, alternative earring or ornamental configurations may be employed. Nevertheless, to the extent that portions of the wireless earpiece assembly 100, such as the casing 150, lend to the appearance of an earring or other ear jewelry, the size, shape, color, and other aesthetic characteristics of the casing 150 and assembly 100 may be selected dependent on the personal preferences of the user 175.

Figure 3:
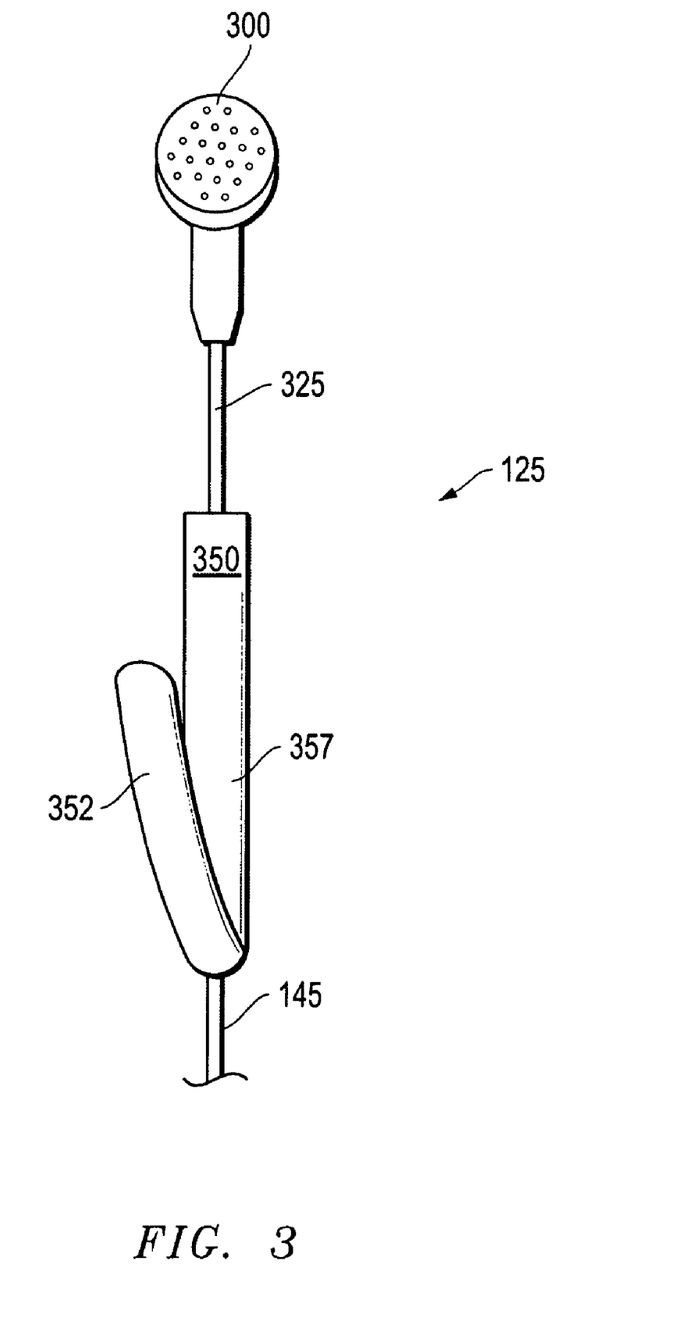
FIG. 3 is an opposing side view of the wireless earpiece assembly of FIG. 1.

Referring now to FIGS. 2 and 3, particular features of one embodiment of the assembly 100 and coupling mechanism 125, in particular, are described in greater detail. In the embodiment shown, the coupling mechanism 125 may have a width of less than about 0.25 inches, extending in a loop-like fashion and contributing to the appearance of a loop earring as noted above. Circumferentially, the coupling mechanism 125 may be between about 0.75 and 3.75 inches and accommodating wiring therethrough, between the casing support 145 and the speaker support 325 as described further below.

The speaker support 325 is physically coupled to the coupling mechanism 125 by conventional means. The speaker support 325 in the embodiment shown is configured similar to the casing support 145 described above. For example, in order to maintain electrical conductivity to the speaker 300, the speaker support 325 may include an electrically conductive core.

The speaker support 325 may also be a dual conductor wiring with a configuration akin to conventional speaker wiring. In this manner, the speaker 300 may be conductively employed by conventional means. However, in the embodiment shown, the speaker support is also configured to support the speaker 300 with a separation 200 as described further below. Therefore, the speaker support 325 may be of heavy gauge wiring configured to retain a manually user-defined shape. That is, the speaker support 325 may be conformed to a stable and naturally retainable configuration by a user 175 as shown in FIG. 2. Alternatively, the speaker support 325 may include conventional higher gauge wiring through a non-compliant cylindrical passage positioned as shown.

In order to achieve both conductivity and stable conformation, embodiments of a speaker support 325 may include between about 8 and about 20 gauge dual conductor metal wiring, most preferably of copper. However, the particular gauge, overall dimensions, and materials selected for the speaker support 325 will be based in part on the weight of the supported speaker 300. For example, in one embodiment, the speaker support 325 may include 16-18 gauge dual copper wiring, with each line independently insulated with up to about 15 mils of a polyethylene, nylon, or other conventional insulating jacket. Such a speaker support 325 would reliably and stably support a conventional earpiece speaker 300 of at least about 0.25 ounces. Additionally, in this embodiment, the speaker support 325 would be no wider across, in diameter or otherwise, than about 0.2 inches, well sized for coupling to closely sized conventional wiring or other conducting means through the coupling mechanism 125 and to the casing support 145.

Referring specifically to FIG. 2, the stability and compliant nature of the speaker support 325 is shown in the user-defined separation 200 that is formed and stably maintained between the speaker 300 and an adjacent ear surface 250. The speaker 300 is shown positioned in line with an auditory canal of the user 175. As described above, the separation 200 may be a result of the user 175 manually shaping the speaker support 325 to the conformation shown based on the user's own personal preference and comfort. Thus, the user 175 is able to keep the speaker 300 off of the ear 177 and ear surface 250 allowing for greater user comfort, especially where the user 175 employs the entire assembly 100 for an extended period of time. This also allows the user to actively balance or counter-balance the weight of the speaker 300 against that of the casing 150 to facilitate desirable positioning of the assembly 100 during wear.

The above-noted separation 200 may be anywhere up to about 0.5 inches depending on the comfort or preference of the user 175. The separation 200 also allows the ear 177 and auditory canal of the user 175 to remain open and unblocked for hearing other sound when the wireless earpiece assembly 100 is in place but not in use. Therefore, the wireless earpiece assembly 100 need not be removed and replaced continuously in order to facilitate good hearing of sound emanating from outside the speaker 300 between uses. Furthermore, the stable nature or heavy gauge of the speaker support 325 allows it to retain its shape once conformed thereto by the user 175. Thus, the user 175 also need not continually shape and position the speaker support 325 upon each use of the assembly 100.

Given the presence of a separation 200 as described above, the speaker 300 employed may be directional in nature. That is, the speaker 300 may employ available and evolving hypersonic sound (HSS) capacity in order to focus or direct sound to the auditory canal of the user 175. In this way, the sound transferred from the speaker 300 is focused across the separation 200, specifically to the user 175. Thus, the separation 200, provided for the comfort of the user 175 is not achieved at the expense of maintaining quality and personal integrity of the sound transferred from the speaker 300 to the user 175. Rather, employing hypersonic sound (HSS) capacity in the speaker 300 delivers quality sound to the user 175 and prevents others nearby from overhearing or being distracted by the sound emanating from the speaker 300.

Referring to FIG. 3, with some added reference to FIG. 2, an embodiment of the coupling mechanism 125 is shown from the side. The main body 350 of the coupling mechanism 125 may be of a variety of conformations. In the embodiment shown, the main body 350 includes a proximal portion 357 coupled to the speaker support 325 that is laterally offset from a distal portion 352 terminating at the fastener 130. In this manner, the fastener 130 itself may be more manually accessible for securing at a user's ear 177. Additionally, the embodiment shown, reveals an offset of the proximal portion 357 toward the back of a user's head, for example, when secured at a user's ear lobe as shown in FIG. 2. In this manner, the offset also helps to better position the speaker 300 adjacent the user's auditory canal.

Figure 4:
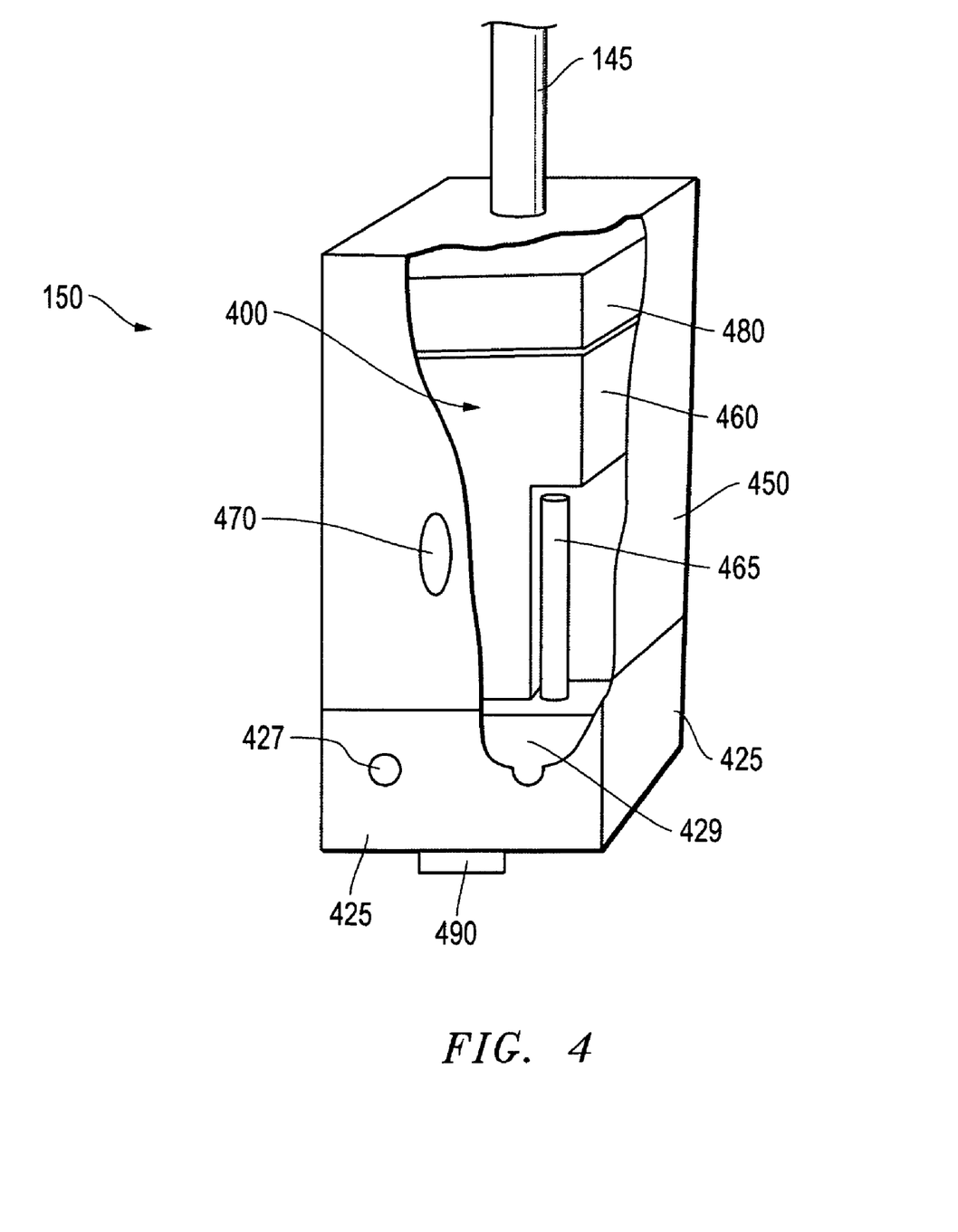
FIG. 4 is a perspective sectional view of a casing of the wireless earpiece assembly of FIG. 1.

Continuing with reference to FIGS. 3 and 4, the coupling mechanism 125 may provide additional advantages. As described above, the coupling mechanism 125 may even be configured to include the casing components (detailed further below) and eliminate the need for a separate casing 150 altogether. In the embodiment shown, however, the coupling mechanism 125 accommodates a casing support 145 for securing a separate casing 150 thereto. The casing support 145 may be a variety of lengths as indicated above, and even extend via wiring 530 to a clip 540 secured at a user's upper garment 578 as described with reference to the embodiment of FIG. 5. Furthermore, the casing support 145 may be configured for exclusively or interchangeably coupling to one of the casing 150 and other above-neckline apparel capable of accommodating conventional components otherwise housed at the casing 150 as described below. That is, the casing support 145 may couple to component housing alternatives to that of the casing 150.

Referring now to FIGS. 2 and 4, the casing 150 is described in further detail. In the embodiment shown, the casing 150 with components 400 therein, includes a significant portion of the bulk or volume of the entire wireless earpiece assembly 100, perhaps more than about half. Therefore, in the embodiment shown, most of the bulk of the wireless earpiece assembly 100 is maintained at a user-friendly location avoiding discomfort to the user 175 therefrom.

With particular attention to FIG. 4, the casing 150 includes an outer shell 450 configured to house several components 400 of the wireless earpiece assembly 100. In the embodiment shown, the casing 150 includes a microprocessor 460 coupled to other components 400 of the casing 150 for directing interaction therebetween. The casing 150 further includes a microphone portion 425 with a microphone 429 resting adjacent sound inlets 427. The microphone 429 may be a focused or array microphone 429 to enhance audio reception thereat should the casing 150 be positioned away from the user's mouth to some degree when in use.

The casing 150 may further accommodate an actuator 490 for physical manipulation by the user 175. For example, when the wireless earpiece assembly is paired to a cell phone, the user 175 may press the actuator 490 to achieve communication with the microprocessor 460 to direct acceptance of an incoming phone call over the wireless earpiece assembly 100 from the cell phone.

A light emitting diode (LED) 470 may further be incorporated into the assembly 100, for example, at the casing 150 as shown in FIG. 4. The LED 470 may be employed to visually indicate an incoming call, pairing with a cell phone, or provide other indications (e.g. for when the assembly 100 is near the user 175 but not being worn). In one embodiment, the actuator 490 itself may be an LED button. In another embodiment, the actuator 490 may be a motion detector, light sensor, or other electronic reader to enhance the stability of the entire wireless earpiece assembly 100 during use by allowing physical manipulation thereof by the user 175 to be achieved by a mere manual touching or covering of the actuator 490.

Additional components 400 of the casing 150 shown in FIG. 4, include a conventional transceiver and antenna assembly 465 along with a power source 480 for the wireless earpiece assembly 100. In fact, the more components 400 accommodated by the casing 150, the less the overall bulk of the wireless earpiece assembly 100 that must be borne at the ear 177 of the user 175.

A single wireless earpiece assembly 100 may be secured as shown in FIGS. 1-4 and then paired to a mobile audio device such as a cell phone. Additionally, multiple wireless earpiece assemblies may be employed simultaneously, for example to deliver stereo quality sound to the user 175.

Figure 5:
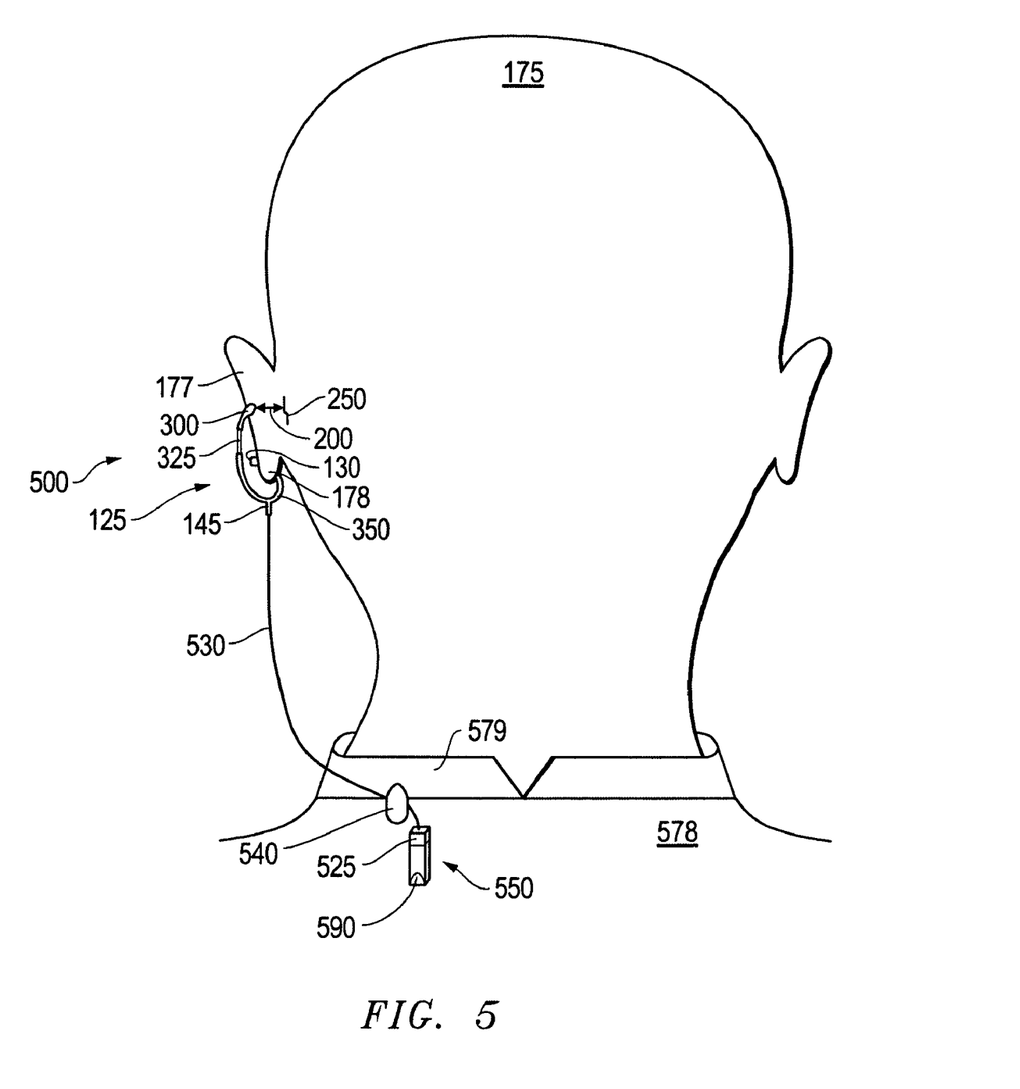
FIG. 5 is a front perspective view of an alternate embodiment of a wireless earpiece assembly secured to an outer ear location of a user and an upper garment of the user.

Referring now to FIG. 5, an alternate embodiment of a wireless earpiece assembly 500 is shown. As with the embodiments of FIGS. 1-4, the assembly 500 includes a coupling mechanism 125 with a main body 350 terminating at one end in a fastener 130. The fastener 130 is for securing the assembly 500 to an isolated location at an outer ear 178 of a user 175, such as at the user's ear lobe. The coupling mechanism 125 also accommodates a speaker support 325 with a speaker 300 at the end thereof. By securing the assembly 500 exclusively to an outer ear 178 portion of a user's ear 177, user comfort is enhanced. In fact, as with the embodiments of FIGS. 1-4, contact between an ear surface 250 and the assembly 500 is substantially eliminated by a separation 200 maintained between the speaker 300 and the ear surface 250 as described further above.

In the embodiments of FIGS. 1-4, bulk of the assembly 100 is located comfortably relative to the user 175 and the user's ear 177. As the weight of earpieces generally reduces over time, the advantage of displacing or locating bulk of such earpieces in this manner remains. Additionally, in the interim, it may be advantageous to locate the better part of both the bulk and the weight of an assembly 100, 500 comfortably relative to the ear 177 of the user 175 as shown in the embodiment of FIG. 5.

In the embodiment of FIG. 5, the overall weight of the assembly 500 that is actually supported by the ear 177 is kept to a minimum. As shown in FIG. 5, the coupling mechanism 125 accommodates a casing support 145 that is coupled to the casing by wiring 530. The wiring 530 is shown secured through a clip 540. The clip 540 may be a small conventional support clip 540, perhaps between about 0.5 and 1.0 inches in length and somewhat smaller in width and depth. However, a variety of alternate clip 540 sizes, shapes and configurations may be employed. For example, the configuration of the clip 540 may be based on the weight of the casing 550 suspended therefrom, as described further herein, or other utilitarian factors.

Continuing with reference to FIG. 5, the clip 540 may additionally incorporate characteristics of size, shape, or color dependent on the aesthetic preferences of the user 175. In another embodiment the clip 540 may be integral with the casing 550, and the wiring 530 may further be partially retractable into a portion of the casing 550, allowing the user 175 to exercise a degree of control over the length of exposed wiring 530. The casing 550 itself may also be configured with the microphone portion 525 at the top thereof, closer to the user's mouth and an actuator 590 located near the bottom thereof, in closer range to the user's hands.

As shown in FIG. 5, the wiring 530 is secured through the clip 540 terminating at a casing 550. In one embodiment, the clip 540 may be proximally and distally mobile about the wiring 530, or otherwise insecure relative to the wiring 530 before positioned as shown. In this embodiment, the clip 540 may be secured to an upper garment 578 of the user 175, for example, at a shirt collar 579. The wiring 530 may then subsequently be positioned according to user preference and substantially immobilized through the clip 540 by conventional means. For example, the wiring 530 may be immobilized at the clip 540 by tightening or securing with a conventional clamp, tortuous positioning of the wiring 530 through the clip 540, or other securing feature integral to the clip 540. Alternatively, the wiring 530 may be integral with the clip 540 and permanently positioned in an immobilized fashion therethrough. In one embodiment an additional coupling mechanism 125, speaker 300 and associated features may be secured to the opposite ear of the user 175 and wired to the casing 550, for example to provide stereo quality sound.

A substantial portion of the bulk and weight of the wireless earpiece assembly 500 is found at the casing 550 where several components are housed. Furthermore, the weight of the casing 550 itself is ultimately supported by, and distributed across, an upper garment 578 of the user 175. That is, the clip 540 is secured to the upper garment 578 while securely immobilizing the wiring 530. Thus, rather than being supported by the outer ear 178 of the user 175, the weight of the casing 550 is translated to the clip 540 and upper garment 578 of the user 175. Translating a substantial portion of the bulk and weight of the wireless earpiece assembly 500 away from the user's ear 177 in this manner enhances user comfort, especially during extended wear.

In embodiments described above, much of the bulk and weight of the wireless earpiece assembly 500 has been translated to the particular location of an upper garment 578 of the user 175. The upper garment 578 is in fairly close proximity to an ear 177 of the user 175 which is advantageous considering that a purpose of the wireless earpiece assembly 500 is delivery of sound. In fact, with respect to the ear 177 of a user 175, an upper garment 578 is one of the nearest commonly worn pieces of apparel of substantial size available for supporting some of the bulk and weight of the wireless earpiece assembly 500. Thus, the length and amount of wiring 530 between the coupling mechanism 125 and the casing 550 may be kept to a minimum.

In keeping wiring 530 to a minimum as described above, the embodiment shown in FIG. 5 is configured for securing the casing 550 exclusively to a location as near the ear 177 of a user 175 as an upper garment 578 of the user 175. In fact, the embodiments shown reveal a configuration for securing the casing 550 exclusively to an upper portion of an upper garment 578 of the user 175 (e.g. at a shirt collar 579). Thus, embodiments of a wireless earpiece assembly 500 may include wiring 530 of no more than about 15 inches in total length, optimizing mobility and user-friendliness in an un-encumbering manner. In one embodiment, the wiring 530 is less than about one foot in length. This is in sharp contrast to a conventional earpiece assembly wired directly to an audio or other device and generally including at least about 40-55 inches of wiring or more.

Embodiments of the wireless earpiece assembly 500 include wireless features such as a capacity for wireless transmission to and/or from a handheld or mobile device such as a cell phone. Limiting the wiring 530 to no more than about 10-15 inches as described above, substantially retains the hands-free and user-friendly aspects of employing wireless features. In fact, the wiring 530 which is present is not only kept to a minimal in length, but it is also uniquely positioned out of the way of the user 175 in an un-encumbering manner. As shown in FIG. 5, and described above, the wiring 530 is short, off to the side, and naturally away from hands or other extremities of the user 175. In fact, in the embodiment shown, the wiring 530 would generally not even be in the line of sight of the user 530. Therefore, the hands-free wireless aspects of the wireless earpiece assembly 500 itself may be fully enjoyed.

Additionally, while it would be possible to translate the above mentioned weight and bulk to locations other than an upper garment 578 such as to eyewear or headwear, an upper garment 578 has the unique advantage of being everyday wear for most of the world. This is especially true of the world making regular use of devices such as the described wireless earpiece assembly 500. By way of comparison, hats, headphones, sunglasses, prescription glasses, and other garments or accessories generally worn above the neckline are not necessarily everyday wear for most people. Some form of upper garment 578, on the other hand, such as a shirt, blouse, dress, jacket, vest, sweater or other top is worn almost everyday by almost everyone.

As a further alternative to the embodiment of FIG. 5, a narrow ear support for wrapping behind and around the user's ear 177 may be substituted for the coupling mechanism 350. Positioning of the speaker 300 and speaker support 325 may be maintained as shown in FIGS. 1-5. Additionally, with the replacement of the coupling mechanism 350, the outer ear 178 is now completely free for securing of the casing 550 thereto. The casing 550 would be wired to the ear support, which itself may take up no more than about 0.25 inches in width behind the user's ear 177.

Embodiments described above provide a wireless earpiece assembly 100, 500 configured to minimize the uncomfortable effects of bulk and potentially weight to a user 175 employing such an assembly 100, 500, especially during long term wear. The embodiments described also simultaneously optimize the user-friendly, hands-free and non-cumbersome advantages afforded by wireless technology, for example, by remaining completely free of potentially cumbersome wiring or alternatively employing no more than a minimal total wiring 530 that is positioned out of the way of the user 175.

Although exemplary embodiments describe particular wireless earpiece assemblies configured with a casing displaced such that only a fastener for coupling to a user's outer ear generally contacts the user, additional embodiments are possible. For example, the wireless earpiece assembly may be configured for pairing to a host of devices, such as radios or other audio devices, and not limited to mobile cell phones as described hereinabove. Furthermore, many changes, modifications, and substitutions may be made without departing from the spirit and scope of the described embodiments. For a period following publication of this application and/or patent, a copy hereof may be made available at www.Licentia-IP.com.

I claim:

1. A wireless earpiece assembly comprising:
    a speaker for delivering sound to an ear of a user;
    a casing for housing a component of the wireless earpiece assembly;
    a fastener for securing the wireless earpiece assembly to an outer ear location of the ear;
    a coupling mechanism to accommodate said speaker and said fastener; and
    a casing support coupled to said coupling mechanism and said casing to displace said casing from said coupling mechanism to a location below the ear.

2. The wireless earpiece assembly of claim 1 wherein said fastener is one of a piercing, a clamp, a cuff, and a wrap.

3. The wireless earpiece assembly of claim 1 wherein said fastener contacts no more than about 1.0 inches longitudinally of an outer ear surface of the ear.

4. The wireless earpiece assembly of claim 1 wherein the outer ear location is one of an ear lobe of the ear, cartilage at the back of the ear, and cartilage at the front of the ear.

5. The wireless earpiece assembly of claim 1 wherein the coupling mechanism is up to about 0.25 inches wide.

6. The wireless earpiece assembly of claim 1 wherein the coupling mechanism is between about 0.75 inches and about 3.75 inches circumferentially.

7. The wireless earpiece assembly of claim 1 further comprising a weighted extension extending from said coupling mechanism to balance the wireless earpiece assembly relative to the ear.

8. The wireless earpiece assembly of claim 1 wherein said casing is positioned along said coupling mechanism relative to said speaker as a counterbalance thereto.

9. The wireless earpiece assembly of claim 1 wherein a weight of said casing is supported from an upper garment of the user.

10. The wireless earpiece assembly of claim 1 wherein the component is one of a microprocessor, a microphone, an actuator, a power source, a light emitting diode, and a transceiver and antenna assembly.

11. The wireless earpiece assembly of claim 10 wherein the actuator is an electronic reader for actuation by a manual touching thereof.

12. The wireless earpiece assembly of claim 1 wherein the location below the ear is a location between the ear and a neckline of the user.

13. The wireless earpiece assembly of claim 12 wherein said casing support is of a pliant conformation for loosely suspending said casing from said coupling mechanism.

14. The wireless earpiece assembly of claim 13 wherein the microphone is a focused microphone.

15. A wireless earpiece assembly comprising:
    a speaker for delivering sound to an ear of a user;
    a casing for housing a component of the wireless earpiece assembly;
    a first fastener for securing to a first outer ear location;
    a second fastener for securing at a second outer ear location;
    a coupling mechanism to accommodate said speaker, said first fastener, and said second fastener; and
    a casing support for displacing said casing from said coupling mechanism to a location between the ear and a neckline of the user, said casing support to retain a stable user-defined conformation and direct said casing toward a mouth of the user.

16. The wireless earpiece assembly of claim 15 wherein said casing support is between about 8 gauge and about 20 gauge dual conductor wiring.

17. An earpiece comprising:
    a fastener for securing the earpiece to an outer ear location of an ear of a user;
    a speaker for delivering sound to the ear;
    a coupling mechanism to accommodate said fastener and said speaker;
    a speaker support for electrical and physical coupling of said speaker to said coupling mechanism, said speaker support to provide a stable separation between said speaker and the user's ear, said speaker equipped with a directional sound delivery capacity to focus the sound across the separation to the user's ear during the delivering while maintaining substantial personal integrity of the sound.

18. The earpiece of claim 17 wherein said speaker support is less than about 0.2 inches wide.

19. The earpiece of claim 17 wherein said speaker support is of conformable wiring configured to stably retain a user-defined shape.

20. The earpiece of claim 19 wherein the conformable wiring is between about 8 gauge and about 20 gauge.

21. The earpiece of claim 17 wherein the separation is up to about 0.5 inches.

22. A wireless earpiece assembly comprising:
    a speaker;
    an ear support coupled to said speaker and to occupy a location between an ear of a user and a head of the user; and
    a casing coupling to said ear support and for housing a component of the wireless earpiece assembly, a portion of the weight of the casing to be supported from another position at an outer ear location, the location being one of an ear lobe of the ear, cartilage at the back of the ear, and cartilage at the front of the ear.

23. The wireless earpiece assembly of claim 22 wherein said ear support is configured to occupy less than about 0.25 inches in width between the ear and the head.

24. A method of employing a wireless earpiece assembly comprising:
    securing a wireless earpiece assembly to an outer ear location of a user's ear with a fastener, the assembly having a coupling mechanism for accommodating the fastener and a speaker, a casing support coupled to the coupling mechanism to displace a casing housing a component of the assembly to a location between the ear and a neckline of the user; and wirelessly coupling the wireless earpiece assembly to an audio device.

25. The method of claim 24 wherein the audio device is a mobile cell phone.

26. A method of wirelessly employing earpiece assemblies, the method comprising:

securing a first wireless earpiece assembly to a first outer ear location of a user's first ear; and securing a second wireless earpiece assembly to a second outer ear location of the user's second ear, the first and second wireless earpiece assemblies each including a coupling mechanism accommodating a speaker for delivery of sound, a casing for housing a component of the respective earpiece assembly, a fastener for said securing, and a casing support for displacing said casing from said coupling mechanism to a location between the ear and a neckline of the user.

27. The method of claim 26 further comprising delivering stereo sound to the user's first and second ears with the speakers of the first and second earpiece assemblies.

* * * * *